July 29, 1952 S. H. SWIFT 2,604,925
DISPLACEABLE VEHICLE SEAT
Filed March 30, 1950 3 Sheets-Sheet 1
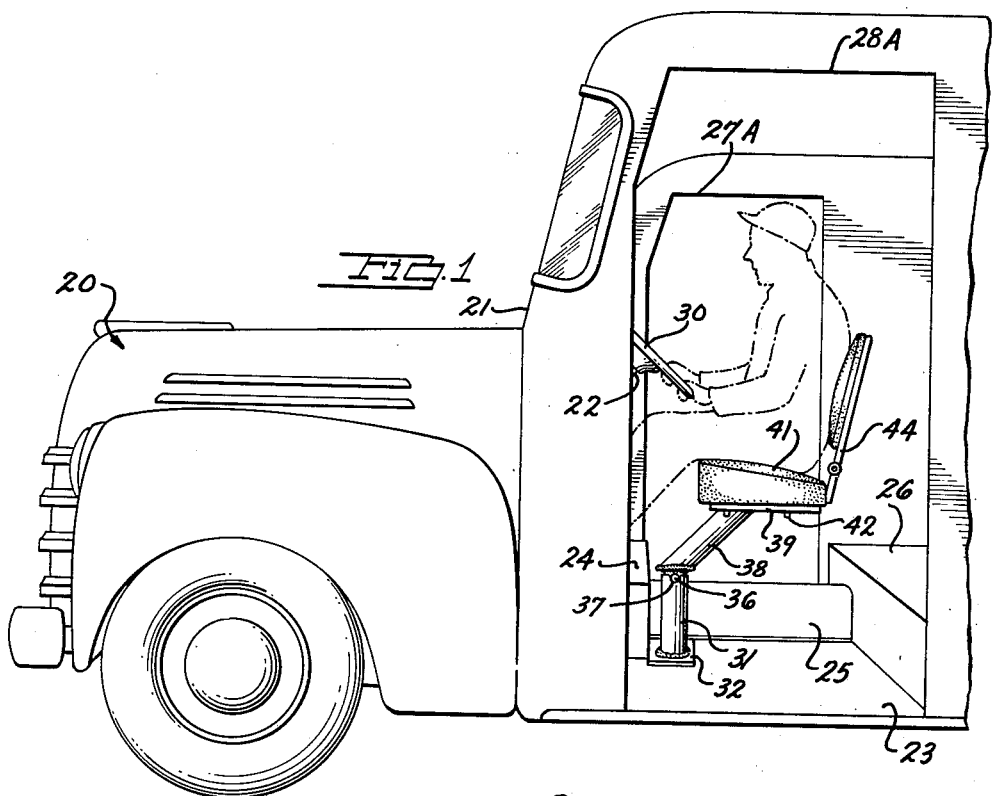
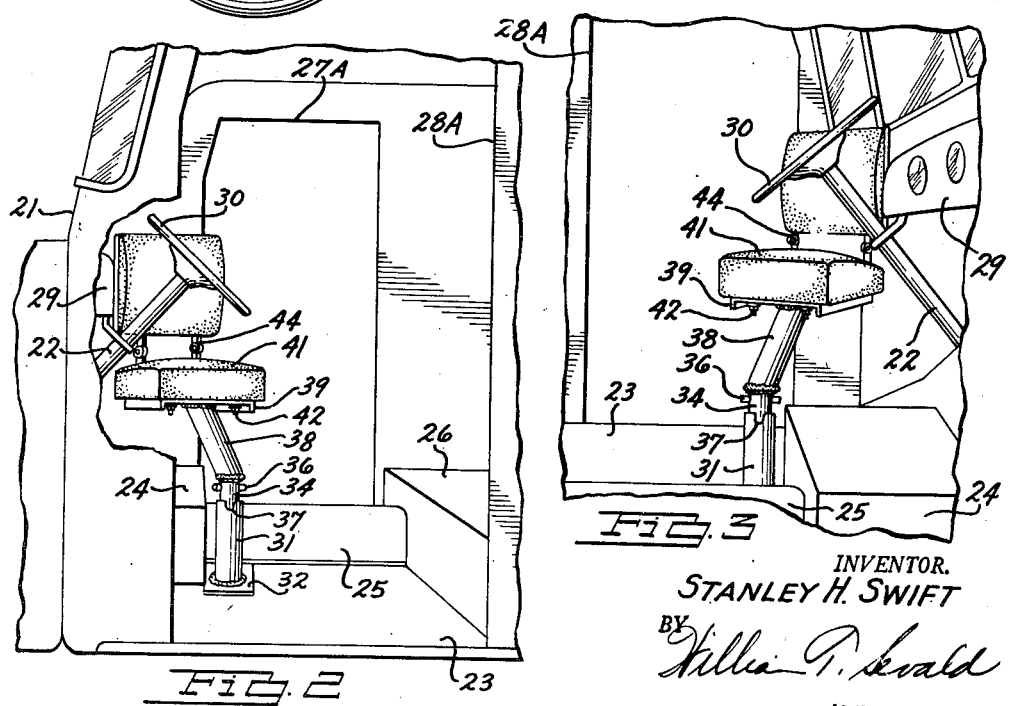
INVENTOR.
STANLEY H. SWIFT
ATTORNEY July 29, 1952  S. H. SWIFT  2,604,925
DISPLACEABLE VEHICLE SEAT
Filed March 30, 1950  3 Sheets-Sheet 2
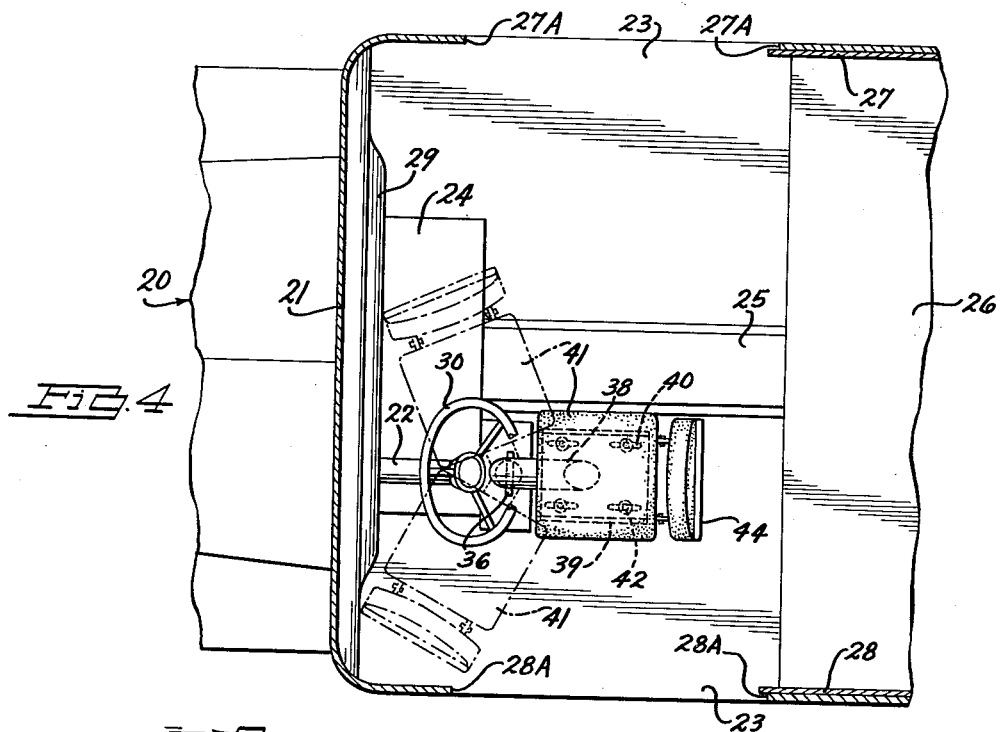
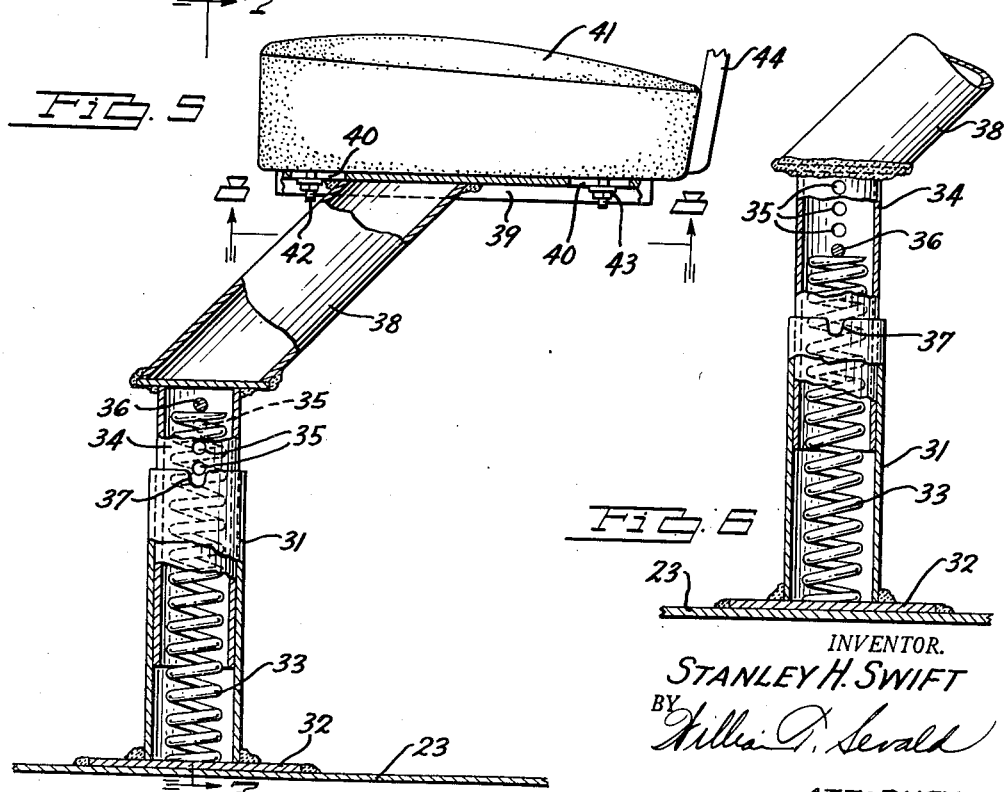
INVENTOR.
STANLEY H. SWIFT
BY
ATTORNEY July 29, 1952  S. H. SWIFT  2,604,925
DISPLACEABLE VEHICLE SEAT
Filed March 30, 1950  3 Sheets-Sheet 3
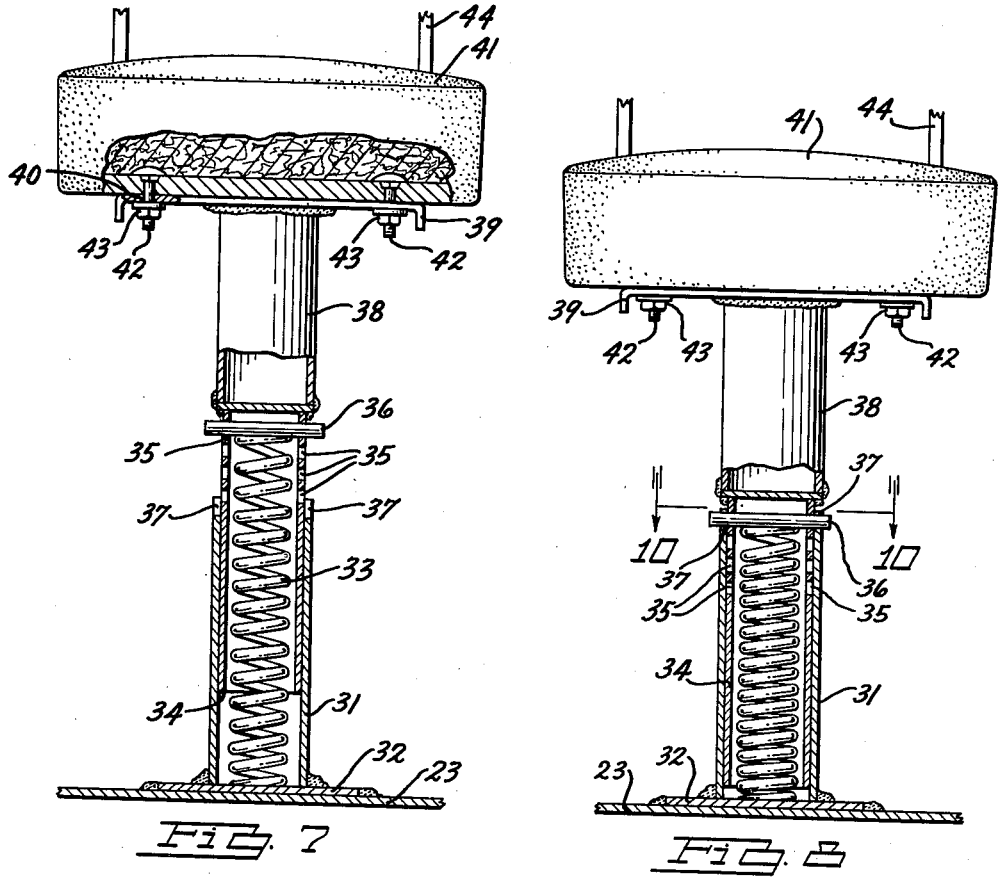
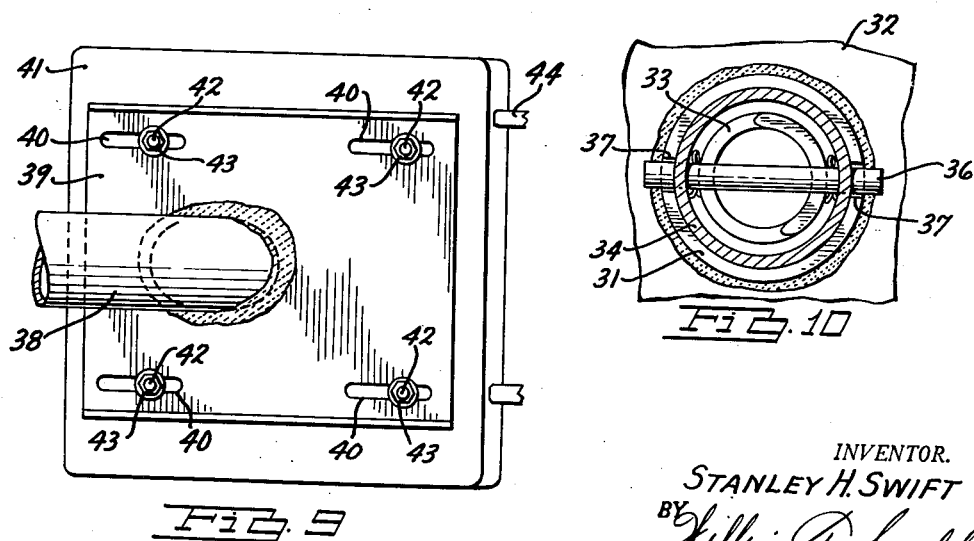
INVENTOR.
STANLEY H. SWIFT
BY
ATTORNEY Patented July 29, 1952

2,604,925

UNITED STATES PATENT OFFICE 2,604,925

DISPLACEABLE VEHICLE SEAT

Stanley H. Swift, Saginaw, Mich.

Application March 30, 1950, Serial No. 152,812

6 Claims. (Cl. 155—9)

This invention relates to a displaceable driver's seat for a front end vending delivery truck and more particularly relates to a driver's seat which positions the driver in normal sitting position to the standard steering wheel and standard vehicular controls, and which swings out of normal driving relation with the steering wheel and controls to a position on either side of the steering wheel to provide a clear aisle-way in the front portion of the vehicle normally occupied by a driver's seat for loading and unloading the vehicle and for customers to enter the vehicle together with the driver to select merchandise.

The utility and economy of front end delivery vehicles is well established as these vehicles save the driver much valuable time and render his work easier so that he can work more hours per day. The utility of the front end delivery vehicle is occasioned by the fact that the vehicle is driven from the front with the driver necessarily in the front part of the vehicle to operate the vehicle from stop to stop. As the driver is already in the forepart of the vehicle, if he can also make his deliveries from the front part of the vehicle this saves him the time of going around and opening the rear doors of the vehicle to get his merchandise; after the sale returning the merchandise to the rear of the vehicle, and then returning to the front part of the vehicle to operate same.

If deliveries are to be made from the front part of the vehicle, a clear aisle space is necessitated so that the driver can freely enter and leave the vehicle, and, if he desires, have a customer enter the vehicle with him. This necessary clear aisle space conflicts with the space required for the steering wheel, gear shift and necessary seat for the ordinary vehicle which is driven from a sitting position. To solve this problem, various types of movable and removable seats have been developed so that the desired aisle space could be cleared by displacing the seat. Also, elaborate types of standing controls have been developed so that the seat could be completely eliminated, thereby gaining the necessary free aisle space in the forepart of the vehicle. The development of the standing controls is indicative of the failure of the prior displaceable seats to solve the problem of clearing the necessary aisle and also providing a satisfactory seat from which to operate the vehicle. The standing controls necessitate expensive additional equipment which renders the resultant vehicle excessively costly as compared to a standard controlled vehicle. However, another factor has worked against the success of the standing controls, in that the driver fatigues early in the day, in that he never is able to sit while driving the vehicle. To overcome this objection, removable seats and a system of dual controls have been developed so that the vehicle could be operated from either a standing or a sitting position; but this again involves additional expense. The seats developed for this purpose have not been satisfactory from a driver's standpoint, due to the fact that the seat has to be laboriously positioned when the driver wishes to drive the vehicle from a sitting position.

It is pertinent to here note that a great many vehicle seats and miscellaneous seats have been developed and patented for clearing an aisle-way which would otherwise be occupied by the seat itself and it is important to recognize that each seat was developed for a certain purpose and to fit with a certain environment or an association of surrounding elements to achieve a definite end. While all the seats were primarily designed to be occupied in their operative position, and, to move to a non-obstructing inoperative position, the new environment which is not suitable for the seats already developed was somewhat different in each instance and necessitated the developing of a new seat to fit the new specific immediate need in the new circumstances and environment.

With the foregoing in view, the primary object of the invention is to provide a displaceable driver's seat for a house to house, front end vending, standard flat faced cowl chassis, standard control delivery truck, which is easily and quickly positionable to support the driver, and which is quickly and easily positionable to clear the aisle in the front portion of the vehicle between the steering wheel and the goods-holding portion of the vehicle body.

An object of the invention is to provide a seat which is easily movable from a normal driving position in a standard vehicle clear of the front doorways of the vehicle and clear of the area between the front doors of the vehicle to provide a clear aisle in the forepart of the vehicle between the steering wheel and the goods-holding portion of the vehicle body.

An object of the invention is to provide a seat which positions the driver normally in relation to standard controls.

An object of the invention is to provide an inexpensive simple seat.

An object of the invention is to provide a seat which enables the employment of an inexpensive, standard chassis, controls and repair parts.

An object of the invention is to provide a seat which is swingable from a non-operating position with or without the weight of the driver thereon to an operating position.

An object of the invention is to provide a seat which utilizes the forward motion of the vehicle when out of driving position to rotate the seat to lockable driving location.

An object of the invention is to provide a seat which utilizes the driver's weight to lock the seat in driving position.

An object of the invention is to provide a seat which automatically unlocks from its driving position when the driver removes his weight therefrom.

An object of the invention is to provide a seat which is swingable from a position beneath the driver to non-operating position.

An object of the invention is to provide a seat having a forwardly inclined base so that when the seat is swung from its operating position to a position on either side of the steering wheel, gravity will prevent the seat from swinging from its inactive displaced position.

These and other objects of the invention will become apparent by reference to the following description of a front end delivery truck embodying the invention taken in connection with the accompanying drawings in which:

Fig. 1 is a side elevational view of a front end vending delivery truck showing the front portion of the vehicle illustrating the inventive seat in driving relation to the standard controls of the vehicle with a driver shown in dotted lines in normal sitting relation to the controls.

Fig. 2 is a view similar to Fig. 1 showing the seat displaced from driving position to a non-obstructing position at the right of the steering wheel leaving the space clear normally occupied by a driver's seat in a conventionally controlled vehicle forming an aisle in the forepart of the vehicle between the steering wheel and the goods-holding portion of the vehicle for the delivery of merchandise and the admittance of customers.

Fig. 3 is a view similar to Figs. 1 and 2 showing the seat displaced from driving position to a position at the left of the steering wheel.

Fig. 4 is a top plan view of the vehicle as seen in Fig. 1 showing the right and left displaced position of the seat in dotted lines.

Fig. 5 is an enlarged side elevational view of the invented seat, partly in cross-section, showing the working parts of the seat and showing the vertical and horizontal adjustment to accommodate drivers of different size; the seat being in its lowest adjusted vertical position.

Fig. 6 is a partial view of the seat showing the vertical adjustment in its highest position.

Fig. 7 is a front view of the seat partly in elevation and partly in cross section disposed in condition to freely swing to displaced position.

Fig. 8 is a view similar to Fig. 7 showing the seat in locked driving condition with the driver's weight compressing the spring to render the indexing and locking means operable.

Fig. 9 is a bottom view of the seat showing the horizontal adjusting means, and

Fig. 10 is an enlarged cross-sectional view of Fig. 8 taken on the line 10—10 thereof showing the disposition of the cross-pin supported on the spring.

Referring now to the drawing wherein like numerals refer to like and corresponding parts throughout the several views, the vehicle disclosed therein to illustrate the environment of the invention comprises a standard vehicle 20, Figs. 1 to 4, including a standard flat face cowl 21 constituting the front of the vehicle body, a standard steering gear 22 behind the cowl 21, a dropframe floor 23 formed by welding supports to the standard frame of the vehicle below the standard frame and then cutting out the standard frame in the area of the vehicle doorways and floor, a transmission housing 24 extending above the lowered floor 23 enclosing the standard transmission, a propeller shaft or torque housing 25 leading rearwardly from the transmission housing 24 enclosing the standard propeller shaft, a goods compartment floor 26 positioned on the standard frame contacting the housing 25 so as to house the torque tube rearwardly of the housing 25 and so as to be on a level above the dropped floor 23, a right front door 27 adapted to close the opening 27A in the area of the floor 23, a left front door 28 adapted to close the opening 28A in the area of the floor 23, a standard instrument panel 29, a standard steering wheel 30. The low floor 23 and doorways 27A and 28A permit the driver to enter or leave the vehicle in standing position with one low step up or down and it is to be noted that the vehicle so far described has a clear aisle way between the steering wheel 30 and the goods holding area of the vehicle.

The inventive seat comprises a seat post or socket 31 positioned below the steering wheel 30, a floor plate 32 welded to the socket 31 which is in turn bolted or welded to the floor 23 of the vehicle so that the post 31 is located at a point approximately below the steering wheel 30 and on a longitudinal line in the vehicle extending rearwardly of the steering gear 22, a spring 33, Fig. 5, disposed within the socket 31, a sleeve or member 34 telescoping or otherwise suitably arranged with the socket 31 so as to be laterally supported by said socket and adapted for free endwise and rotational movement therewith; the sleeve or member 34 being equipped with a series of spaced paired apertures 35 adjacent its top for adjustably receiving and positioning a pin 36 disposed in one pair of spaced apertures 35. The pin 36 is adapted to be press fitted or secured to the sleeve 34 with cotter pins or the like so that the pin 36 projects sidewise outwardly from the sleeve 34 with the pin projections constituting stops or dogs. The socket 31 is equipped with aligned notches 37 at its top edge or face suitable to receive the projecting ends of the pin 36 therein to index and lock the sleeve 34 relative to the socket 31 against rotational movement therebetween and to support the sleeve endwise after the spring 33 has been compressed.

The outwardly projecting extension or cantilevered arm 38 is welded on the sleeve 34. The base plate 39 is welded on the top of the arm 38 and is equipped with bolt receiving slots 40 while the seat 41 is positioned on the base plate 39 and secured thereto to bolts 42 disposed in the slots 40 of the base plate 39 with the nuts 43 and the bolts 42 adjustably securing the seat 41 via the slots 40 to the base plate 39. The seat-back 44 is preferably attached to the seat by a rigid connection to prevent the back from falling down on seat 41 so as to provide means associated with the seat for contacting the instrument panel 29 or the inside of the cowl 21 to prevent the seat from swinging under the steering gear 22 and to provide hand-high means to a standing person to move the seat toward a proper operating position.

Referring to Figs. 5 to 10, the seat 41 can be adjusted toward or away from the steering wheel 30 by loosening the nuts 43 and sliding the seat 41 relative to the plate 39 with the seat bolts 42 traveling in the plate slots 40 to the desired position where the seat 41 can be secured by tightening the nuts 43.

Relative to the vertical adjustment of the seat 41 to the steering wheel 30, the series of paired apertures 35 in the sleeve 34 provide means for positioning the pin 36 in the sleeve 34 to change the relative lengthwise relation between the socket 31 and the sleeve 34. As seen in Fig. 6, locating the pin 36 in the lowest aperture 35 raises the seat 41 to accommodate a tall person while locating the pin 36 in the highest aperture 36, Fig. 5, lowers the seat to accommodate a short person. It is important to note that positioning the pin 36 in any aperture 35 to raise or lower the seat 41 relative to the steering wheel 30, does not change the relationship of the pin 36 relative to the spring 33, the socket 31, or the notch 37 in the socket 31.

The weight of sleeve 34, arm 38, plate 39, seat 41, and back 44 is normally borne by the spring 33 via the pin 36 with the socket laterally supporting the sleeve 34 and associated parts, Figs. 5, 6, and 7, with the sleeve freely pivotally disposed relative to the spring 33 and pin 36 resting on the closed and flattened upper end of the spring 33.

The seat may be freely pivoted or rotated relative to the socket 31 with the spring 33 supporting the pin 36 above the top face of the socket 31 well above the notch 37 and it is in this condition that the seat may be pivoted to either the right or left of the steering wheel 30 of the vehicle.

When it is desired to use the seat to operate the vehicle, the driver swings the seat to the rear of the steering wheel and sits thereon and with his weight collapsing the spring 33 from the position shown in Fig. 7 to the position shown in Fig. 8 with the pin 36 traveling downwardly with the sleeve 34 until it enters the notch 37 in the upper edge of the socket 31 which supports the sleeve 34 and associated parts against further downward movement relative to the socket 31. In the event the driver has not indexed the pin 36 with the notch 37, the pin 36 will rest on the un-notched upper edge or face of the socket 31 thereby supporting the sleeve 34 relative to the socket 31 and upon the driver starting the vehicle in forward motion, the seat will swing directly in line with the steering wheel thereby indexing the pin 36 with the notch 37 to lock the sleeve 34 to the socket 31 against relative rotational movement as hereinafter more fully explained.

The socket 31 is preferably forwardly inclined in the vehicle by inclining the socket forwardly relative to the floor 23 or by sloping the floor itself forwardly so that the seat swings somewhat downwardly from its operating position rear of the steering wheel to its inoperative position on either side of the steering wheel against the dashboard or instrument panel where it remains positioned due to the fact that it would have to swing upwardly to return to its operating position to the rear of the steering wheel. The socket 31 is positioned immediately below the steering wheel and occupies dead space relative to the aisle-way between the doorways 27A and 28A and the outwardly projecting extension or cantilevered arm 38 provides means for supporting the seat rearwardly of the steering wheel and means for swinging the seat around the steering wheel to a position on either side of the steering wheel where the seat occupies dead space as far as the aisle-way between the doorways 27A and 28A is concerned leaving the aisle-way between the doorways clear for use in loading or unloading the vehicle or for allowing customers to enter to select merchandise.

*Displacing the seat to clear the aisle*

In operating a vehicle equipped with the inventive seat, the driver has the option of getting off the seat facing either doorway 27A or 28A and in the event he desires to face the left doorway 28A, he raises himself slightly taking his weight off the seat, allowing the spring 33 to drive the sleeve 34 upwardly relative to the socket 31 carrying the pin 36 out of the notch 37. The driver then moves the seat to his right by twisting his body or using his hand so that the pin 36 is out of alignment with the notch 37; he can then replace his weight on the seat and ride part way around with the seat as it pivots and while it is so pivoted he can drop his feet to the floor and move off the seat and the seat will continue to move until it contacts the instrument panel where it remains positioned. When the driver has ridden part way around with the seat and slides off, he is facing the doorway which he desires to face and he can then reach into the goods carrying portion of the vehicle and take his merchandise. In the event the driver wishes to leave by the right-hand doorway 27A, he lifts his weight relative to the seat allowing the spring 33 to drive the sleeve 34 upwardly relative to the socket 31 carrying the pin 36 out of the notch 37 thereby permitting the sleeve 34 to pivot relative to the socket 31. After the sleeve has pivoted slightly positioning the pin 36 out of alignment with the notch 37 the driver can replace his weight on the seat and ride part way around as the seat pivots towards the dash-board and at any point before the seat passes the steering wheel, he can slide off the seat in a standing position on the drop floor 23 facing in the desired direction and the seat will continue pivoting until it contacts the dashboard where it will remain due to its swinging downwardly with socket 31. However, some drivers prefer to get off the seat by lifting themselves off the seat by positioning their feet on the toe board of the vehicle or on the floor 23 in conjunction with gripping the steering wheel 30 so that the pin 36 moves out of the notch 37 as previously described; the driver then swings the seat out from under himself to the right or left as desired and the driver then stands in the cleared space to the rear of the steering wheel 30 previously occupied by the seat 41 where he can easily turn or pivot in the desired direction.

Again other drivers combine the above two described methods of getting off the seat and partially ride and partially swing the seat from under them in the desired direction and partially slide off the seat and partially stand up on the floor 23 as the seat 41 swings to its inoperative position on either side of the steering wheel 30. Some drivers prefer to slide sidewise off the seat and then push the seat in the desired direction which is usually opposite to the direction in which he leaves the seat. It can readily be seen that no matter how the driver leaves the seat, the seat 41 automatically unlocks and readily moves to a position on either side of the steering wheel 30 out of the way of the driver occupying dead space in the vehicle and clear of the aisle-way between the doorways 27A and 28A which leaves completely unobstructed space between the steering wheel and the goods holding portion of the vehicle.

*Placing the seat in driving position*

When the driver desires to operate the vehicle he swings the seat away from the dash-board by grasping the seat back 44 with his hand, he then sits on the seat 41 compressing the spring 33 with the sleeve 34 traveling downwardly relative to the socket 31 so that the pin 36 comes into contact with the top edge of the socket 31 or enters the notch 37 to lock the seat directly to the rear of the steering wheel 30. In the event that the driver starts the vehicle with the seat not directly to the rear of the steering wheel 30 the pin 36 will support the weight of the driver on the top face or edge of the socket 31, and, when the vehicle moves forwardly the cantilevered extension or arm 38 in conjunction with the further extended and cantilevered seat 41 and back 44 acts as a pivoted centrifugal counterweighted member and moves to a position directly opposite the line of force developed by the forwardly moving vehicle which position is directly behind the socket 31 or pivot point and directly to the rear of the steering wheel 30 in which position the pin 36 is indexed or aligned with the notch 37 into which it sinks under the weight of the driver thereby locking the seat in proper driving position. This feature is very important in a displaceable driver's seat in that it insures proper positioning and locked driving relation no matter how haphazardly the driver positions the seat when he starts the vehicle and it is also very important from the driver's standpoint of saving time as he does not have to spend time to carefully align the seat in proper driving position; he can just swing the seat around and sit in it and let the seat do the rest when he starts the vehicle forwardly.

Relative to the physical principles and seat structure involved in automatically properly positioning the seat in driving condition if the driver has not so set the seat, the socket 31 is positioned between the steering wheel 30 on a longitudinal line in the vehicle with the center of the steering wheel 30. Due to the projecting extension or cantilevered arm 38 and the further projecting and cantilevered seat 41 and back 44, if the seat is not properly positioned it is not on the vehicular longitudinal line pivoted with the socket 31, i. e., it is to one side or the other of the line. When standing, gravity provides inertia in the vehicle seat and driver. When the vehicle starts forwardly inertia is overcome by forward force and momentum developed. If the seat is to one side of the line it is free to swing as it is not locked and the inertia of the seat and driver persists until overcome by the forward force by a positive mechanical connection such as by traveling to dead center opposite the direction of force, i. e., moving to the vehicular longitudinal line at which the pivot point is located, which is a point directly to the rear of the socket 31 directly behind the steering wheel 30, which is the proper driving condition of the seat in relation to the vehicle and is the point at which the seat automatically locks against pivoting. In other words, the pivoted off-center arm and seat in conjunction with the forward motion of the vehicle is capable of developing centrifugal force to move the seat and drive it to a position directly behind the steering wheel.

Although but a single embodiment of the invention has been shown and described in detail, it is obvious that many changes may be made in the size, shape, detail and arrangements of the elements of the invention within the scope of the appended claims.

I claim:

1. In a front end delivery truck having a standard steering column and a standard steering wheel and having clear aisle space in the area normally occupied by the driver's seat, a socket positioned in the vehicle rearwardly of the steering column approximately on a longitudinal line extending rearwardly from the steering column and approximately directly below the steering wheel of the vehicle, said socket being forwardly inclined in the truck and having a notch in the upper edge of the side wall, a spring disposed within and supported relative to said socket, a sleeve disposed within and laterally supported by said socket surrounding said spring adapted for sliding endwise and rotational movement relative to said socket, a pin through said sleeve adjacent its top and projecting sidewise outwardly from said sleeve; said pin being adapted to have its middle area rest on said spring to vertically support said sleeve in elevated relation to said socket with the projecting portion of said pin in spaced relation from the notched upper end of said socket and with the bottom end of said sleeve in spaced relation above the bottom of said socket, an outwardly cantilevered extension on said sleeve, a seat on said extension; said spring being adapted to be compressed under the weight of a driver sitting on said seat to allow said sleeve to slide downwardly relative to said socket to carry the outwardly projecting portion of said pin into the area of the notch in said socket thereby limiting the downward movement of said sleeve preventing relative rotation between said socket and said sleeve and locking said seat in driving relation with the vehicle, said spring being capable of driving said sleeve upwardly when the driver's weight is removed from said seat to dislodge said pin projection from the notch of said socket to free said sleeve for rotational movement relative to said socket; said outwardly cantilevered extension and said sleeve providing a swinging arm relative to said socket for swinging said seat from a driving position to a position on either side of the steering wheel of the vehicle to clear the space normally occupied by the driver's seat to provide an aisle in the fore-portion of the vehicle; said inclined socket together with said extension comprising means for said seat to swing downwardly toward the front of the vehicle and to prevent said seat from swinging back into driving position; said extension constituting a lever capable of generating centrifugal force in conjunction with the forward motion of the vehicle to swing said seat into driving position to align the projecting end of said pin with the notch in said socket to lock said seat in driving position.

2. A displaceable driver's seat for use in a vehicle having a steering column and a steering wheel and having clear aisle space in the region normally occupied by the driver's seat, comprising a socket positioned in the vehicle approximately on a longitudinal line extending rearwardly from the steering column and approximately directly below the steering wheel of the vehicle, a spring disposed at said socket, said socket having means supporting said spring, a slidable sleeve laterally supported by said socket and resiliently vertically supported by said spring, an extension on said sleeve, a seat on said extension; said spring being adapted to be compressed under the weight of a driver sitting on said seat to allow said sleeve to slide downwardly relative to said socket; said spring being capable of driving said sleeve upwardly when the driver's weight is removed from said seat; indexing means locating said seat in driving relationship along said longitudinal line to the vehicle steering wheel rendered operable by the driver's weight on said seat; said sleeve extension being outwardly cantilevered providing a swinging arm relative to said socket for swinging said seat from a driving position to a position on either side of the steering wheel of the vehicle to clear the space normally occupied by the driver's seat; said seat having a back rest which clears the steering wheel as the seat is swung into inoperative position.

3. In a device as set forth in claim 2, said socket being forwardly inclined to allow said sleeve extension to swing downwardly towards the front of the vehicle by gravity in the absence of centrifugal force and to prevent said extension from swinging back to driving position when the vehicle is standing.

4. In a device as set forth in claim 2, said extension constituting a lever capable of generating centrifugal force in conjunction with the forward motion of the vehicle and the inertia of the seat to swing said seat into driving position to align said indexing means to locate said seat in driving position along said longitudinal line where said means lock automatically under the weight of the driver.

5. A displaceable driver's seat for use in a vehicle having clear aisle space in the region normally occupied by the driver's seat, a primary support post positioned in the vehicle approximately on a longitudinal line extending rearwardly from the steering column and approximately below the steering wheel of the vehicle, a second post telescoping with said support post adapted to move up and down relative to said support post, an outwardly projected cantilevered extension on said second post, a driver's seat mounted on said extension, a spring means supporting said second post in relation to said support post, means associated with said posts for indexing said seat in driving relation to the steering wheel along said longitudinal line; said spring being adapted to collapse under the weight of a driver sitting thereon to render said indexing means operable; said outwardly projecting cantilevered extension providing means whereby the seat may be displaced from a driving position behind the vehicle steering wheel occupying aisle space to a position on either side of the vehicle steering wheel so as to vacate aisle space behind the vehicle steering wheel, and, when out of driving position, constituting means to develop centrifugal force in conjunction with the inertia of the seat under accelerating forward motion of the vehicle to rotate said second post in relation to said support post to position the seat behind the steering wheel and to align said indexing means; said seat having a back rest which clears the steering wheel as the seat is swung into inoperative position.

6. A displaceable driver's seat for use in a vehicle having clear aisle space in the region normally occupied by the driver's seat, a forwardly inclined post positioned in the vehicle approximately on a longitudinal line extending rearwardly from the steering column and approximately below the steering wheel of the vehicle, a second post telescoping with said forwardly inclined post and interfitting with said forwardly inclined post in up and down sliding relation therewith, indexing means for locking both said posts in driving relationship, spring means supporting said second post so as to normally disassociate said indexing means, an outwardly cantilevered extension on said second post, and a seat on said cantilevered extension; said cantilevered extension and seat acting as a lever to rotate said second post in relation to said first post to rotate said seat and cantilevered extension from normal operating position behind the steering wheel to a position on either side of the steering wheel secured by the forward inclination of said first post when the vehicle is standing whereby the region normally occupied by the driver's seat of a vehicle is cleared, said spring means being adapted to collapse under the weight of a driver sitting on said seat to render said indexing means operable.

STANLEY H. SWIFT.

REFERENCES CITED

The following references are of record in the file of this patent:

UNITED STATES PATENTS

| Number | Name | Date |
|---|---|---|
| 1,275,624 | Sopwith | Aug. 13, 1918 |
| 1,400,974 | Parker | Dec. 20, 1921 |
| 1,742,037 | Kleinschmidt | Dec. 31, 1929 |
| 2,242,138 | Muma | May 31, 1941 |